(12) United States Patent
Hart

(10) Patent No.: US 12,497,574 B2
(45) Date of Patent: *Dec. 16, 2025

(54) MICROWAVE EXTRACTION OF ESSENTIAL OILS

(71) Applicant: John F. Hart, Aurora, IL (US)

(72) Inventor: John F. Hart, Aurora, IL (US)

(73) Assignee: Chemtech Services, Inc., Lockport, IL (US)

( * ) Notice: Subject to any disclaimer, the term of this patent is extended or adjusted under 35 U.S.C. 154(b) by 302 days.

This patent is subject to a terminal disclaimer.

(21) Appl. No.: 17/964,664

(22) Filed: Oct. 12, 2022

(65) Prior Publication Data
US 2023/0287298 A1    Sep. 14, 2023

Related U.S. Application Data

(63) Continuation-in-part of application No. 17/690,799, filed on Mar. 9, 2022, now Pat. No. 11,702,615.

(51) Int. Cl.
*C11B 1/10* (2006.01)
*B01D 3/10* (2006.01)
(Continued)

(52) U.S. Cl.
CPC ............... *C11B 9/025* (2013.01); *B01D 3/10* (2013.01); *B01D 11/0211* (2013.01);
(Continued)

(58) Field of Classification Search
CPC .. C11B 9/025; C11B 3/10; B01D 3/10; B01D 11/0211; B01D 11/0296; B01D 5/0045; B01D 5/0027
See application file for complete search history.

(56) References Cited

U.S. PATENT DOCUMENTS 5,458,897 A    10/1995  Pare et al.
5,711,857 A     1/1998  Armstrong
(Continued)

FOREIGN PATENT DOCUMENTS

CA         2161127 A1    11/1994
CN      103194312 A  *   7/2013  ............... C11B 9/02

OTHER PUBLICATIONS

CN 103194312, Liu Jianjun et al., Method for extracting essential oil form cypress leaves, English translation 6 pages (Year: 2013).*

(Continued)

*Primary Examiner* — Yate' K Cutliff
(74) *Attorney, Agent, or Firm* — GREER BURNS & CRAIN, LTD.

(57) ABSTRACT

A method of extracting an essential oil from plant matter, starting with providing plant matter to an interior of an extraction vessel, wherein the plant matter includes at least one essential oil. Next, at least one vacuum pump is used to reduce the pressure within the interior of the extraction vessel with the plant matter therein to an absolute pressure of less than 400 mm Hg absolute pressure. Microwave energy is applied to the plant matter while the interior of the extraction vessel is under the reduced pressure, thereby forming a vapor including at least a portion of the essential oil. The vapor is directed from the extraction vessel to at least one condenser vessel. Finally, the vapor is condensed to a liquid state such that the vapor includes at least a portion of the essential oil, by utilizing the at least one condenser vessel.

29 Claims, 10 Drawing Sheets

(51) Int. Cl.
*B01D 11/02* (2006.01)
*C11B 1/04* (2006.01)
*C11B 9/02* (2006.01)

(52) U.S. Cl.
CPC ...... *B01D 11/0284* (2013.01); *B01D 11/0288* (2013.01); *B01D 11/0296* (2013.01); *C11B 1/04* (2013.01); *C11B 1/10* (2013.01)

(56) References Cited

U.S. PATENT DOCUMENTS

| | | | |
|---|---|---|---|
| 7,001,629 B1* | 2/2006 | Mengal | B01D 11/0211 426/442 |
| 2004/0187340 A1* | 9/2004 | Chemat | B01D 11/0296 34/259 |
| 2020/0398180 A1 | 12/2020 | Hospodor et al. | |
| 2021/0023471 A1* | 1/2021 | Rivas | F26B 3/347 |
| 2022/0017839 A1 | 1/2022 | Powell | |

OTHER PUBLICATIONS

Craveiro, A.A., et al., Microwave extraction of essential oil, Flavour and Fragrance Journal, vol. 4, issue 1, pp. 43-44 (Year: 1989).
Fradette, R.J. et al., Understanding vacuum and vacuum measurements, Solar Atmospheres, Inc. (Year: 2016).
Albert-Vian et al., Microwave-assisted Extraction for Bioactive Compounds Theory and Practice, Chapters 1-4, Food Engineering Series, Oct. 2013, pp. 1-101, Springer Science+Business Media New York 2013.
Hart, John F., The Trouble with Terpenes, Chemtech Services, Inc., pp. 1-11.

* cited by examiner

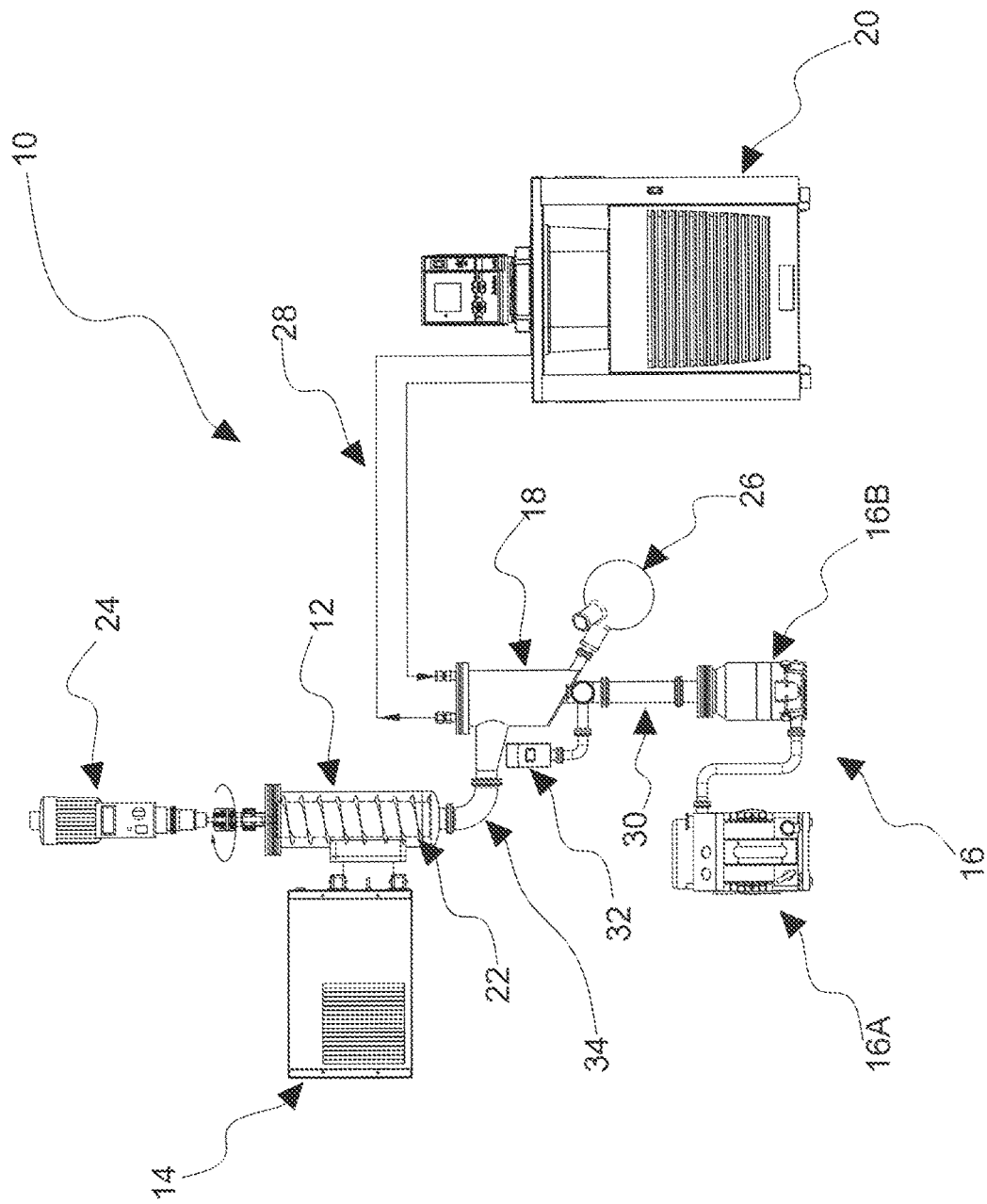

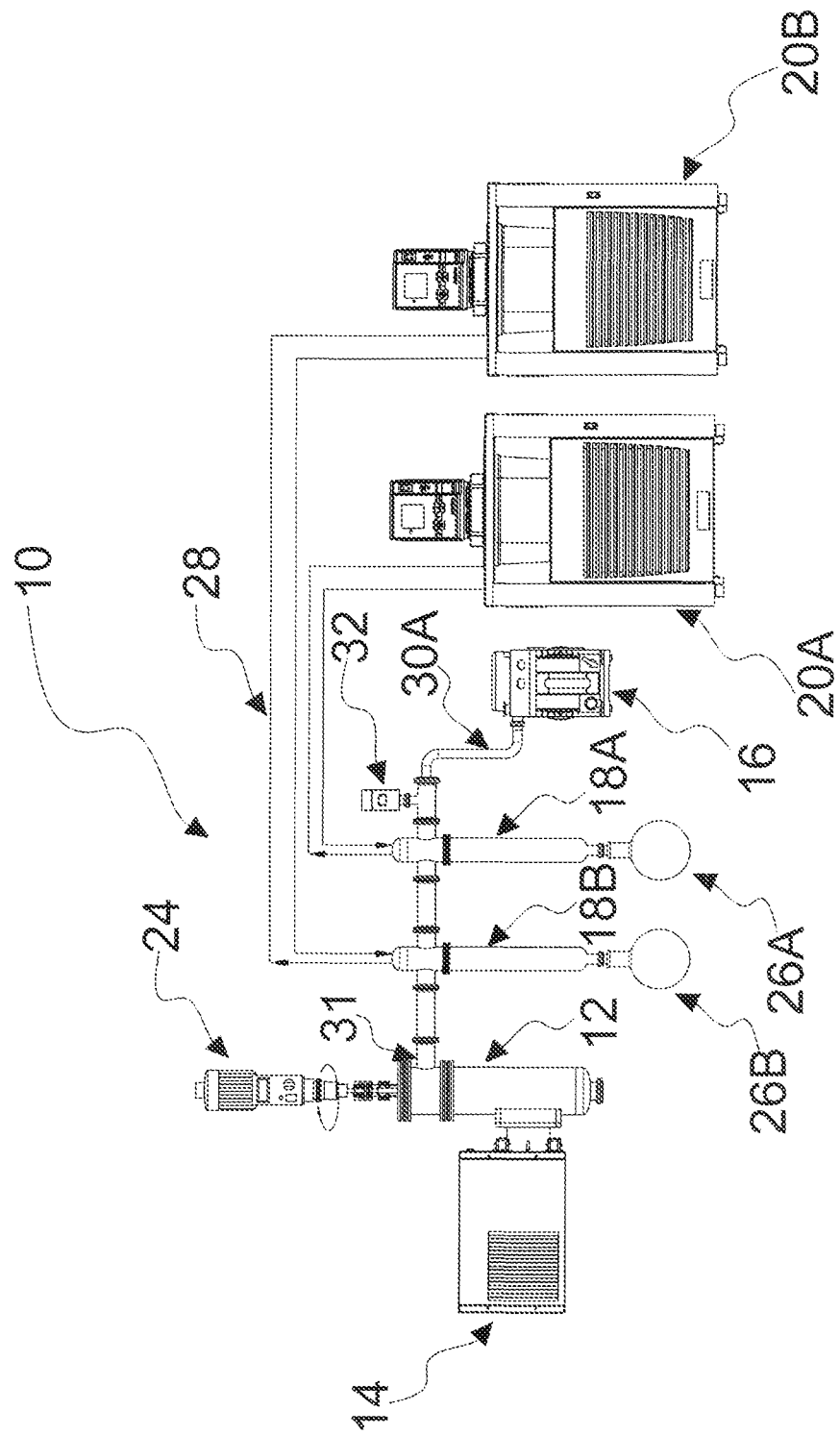

MICROWAVE EXTRACTION OF ESSENTIAL OILS

This application is a Continuation-in-Part (CIP) of application Ser. No. 17/690,799, filed Mar. 9, 2022.

The present invention relates generally to methods and systems of extracting essential oils from plant matter, and more particularly to methods and systems of extracting essential oils from plant matter while applying microwave energy to the plant matter.

BACKGROUND OF THE INVENTION

Certain conventional methods of essential oil extraction (specifically extraction of cannabinoids) from plant matter utilize a solvent to solubilize the cannabinoids and thereby separate the cannabinoids (and possibly terpenoids) from the plant matter. Various solvents that are typically used include (but are not limited to) butane, propane, ethanol, and supercritical CO2. Flammable solvents, such as butane, propane and ethanol require compliance with National Fire Prevention Association guidelines, which may necessitate extensive and costly modification and improvements to processing facilities and equipment. There are also safety concerns associated with the operation of equipment utilizing flammable solvents. Supercritical CO2, although not flammable, requires high pressure vessels compliant with the guidelines detailed in the American Society of Mechanical Engineer's Boiler and Pressure Vessel Code (ASME Code), which increases the cost of equipment and imposes size limitations relating to the rate of processing.

BRIEF SUMMARY OF THE INVENTION

In certain preferred embodiments, the current invention does not require the use of flammable solvents and/or it does not require vessels which operate at high pressures. The current invention utilizes microwave energy in conjunction with high vacuum, in a closed loop vessel design to separate the cannabinoids and/or terpenoids (and/or other essential oil(s)) from the plant matter by vaporizing the cannabinoids and/or the terpenoids under high vacuum and subsequently re-condensing the vapors and collecting the resultant liquid phase product in a receiver vessel. Terpenoids typically have lower boiling points (BPs) than cannabinoids and their BPs typically range from 150° C. to 350° C. Examples of Terpenoids that can be separated include: pinene (BP=158° C.); beta-myrcene (BP=167° C.); limonene (BP=175° C.); beta-caryophyllene (BP=268° C.); and phytol (BP=355° C.). Examples of cannabinoids that can be separated include: Tetrahydrocannabinol (THC)(BP=408° C.); cannabidiol (CBD)(BP=438° C.); cannabinol (CBN)(BP=445° C.); and cannabichromene (CBC)(BP=489° C.). Of course, other cannabinoids and terpenoids, as well as other essential oils, may be separated using the current systems and processes as well.

More specifically, the present invention provides a method of extracting an essential oil from plant matter, where the method includes the following steps: (i) providing plant matter to an interior of an extraction vessel, wherein the plant matter includes at least one essential oil; (ii) using at least one vacuum pump to reduce the pressure within the interior of the extraction vessel with the plant matter therein to an absolute pressure of less than 400 mm Hg absolute pressure; (iii) applying microwave energy to the plant matter that is within the extraction vessel while the interior of the extraction vessel is under the reduced pressure, wherein a combination of the reduced pressure and the microwave energy creates a vapor comprising at least a portion of the essential oil included with the plant matter within the extraction vessel; (iv) directing the vapor that includes at least a portion of the essential oil from the extraction vessel to at least one condenser means; and (v) condensing the vapor to a liquid state such that the vapor includes at least a portion of the essential oil, by utilizing the at least one condenser means, to at least one liquid including the essential oil.

Additionally, the present invention also relates to a method of extracting an essential oil from plant matter, where the method includes the following steps: (i) drying plant matter that includes at least one essential oil until the plant matter has a moisture content of less than 5.0% by weight; (ii) providing the plant matter to an interior of an extraction vessel, wherein the plant matter includes at least one essential oil; (iii) using at least one vacuum pump to reduce the pressure within the interior of the extraction vessel with the plant matter; (iv) applying microwave energy to the plant matter that is within the extraction vessel while the interior of the extraction vessel is under the reduced pressure, wherein a combination of the reduced pressure and the microwave energy reduces the observed boiling point and creates a vapor comprising at least a portion of the essential oil included with the plant matter within the extraction vessel, wherein the step of using the at least one vacuum pump and the step of applying microwave energy are performed after the step of drying the plant matter; (v) directing the vapor that includes at least a portion of the essential oil from the extraction vessel to at least one condenser means; and (vi) condensing the vapor that includes at least a portion of the essential oil, by utilizing the at least one condenser means, to at least one liquid including the essential oil.

BRIEF DESCRIPTION OF THE SEVERAL VIEWS OF THE DRAWINGS

Preferred embodiments of the present invention are described herein with reference to the drawings wherein:

FIG. 2A is a schematic diagram depicting a first embodiment of the present invention;

FIG. 3B is a schematic diagram depicting a modification of the embodiment of FIG. 3A;

DETAILED DESCRIPTION OF THE INVENTION

Figure 1:
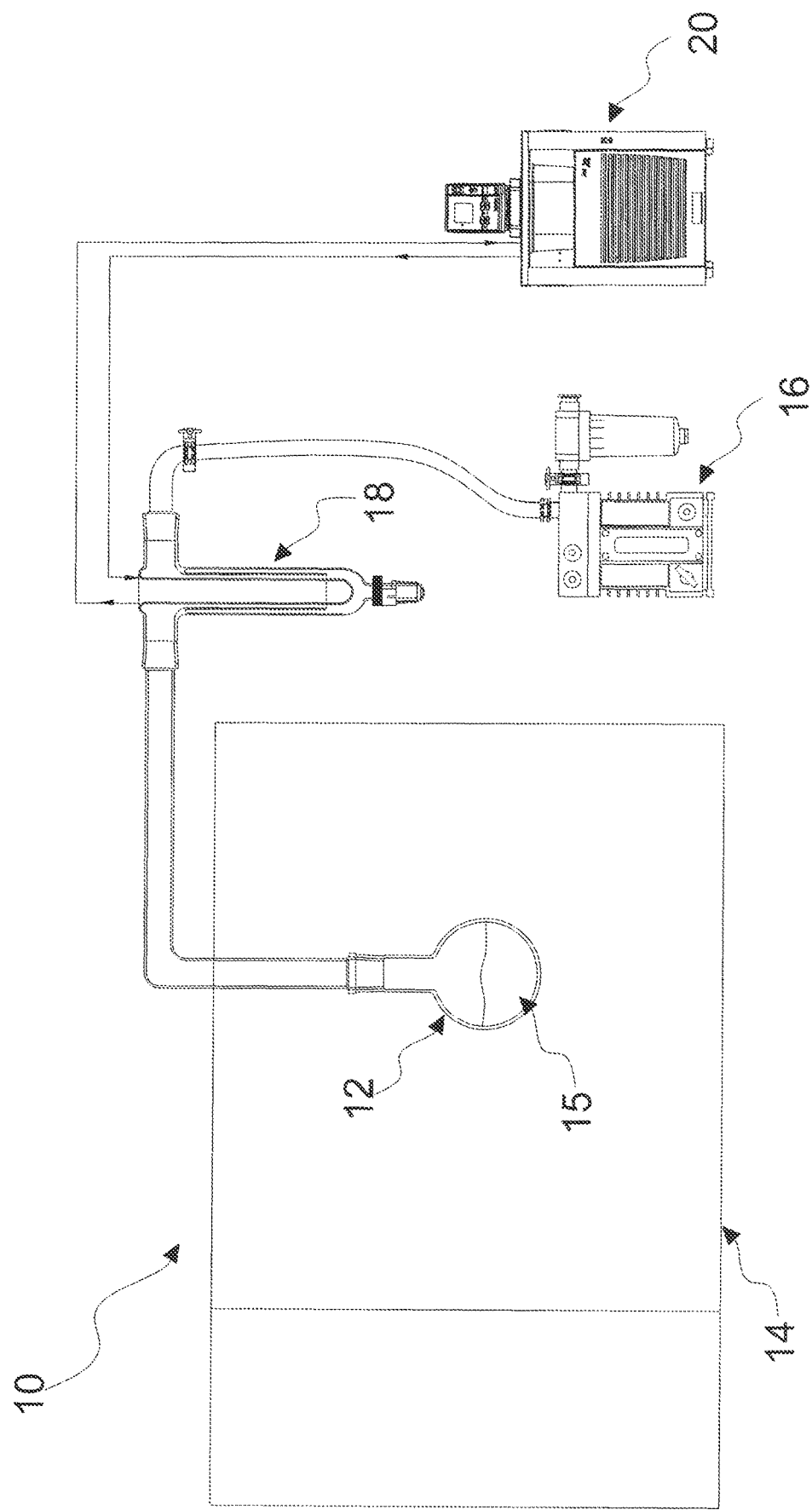
FIG. 1 is a schematic diagram depicting the basic principles of the present invention.

FIG. 1 shows an example of the basic principles of the present invention, exemplified as a simple prototype that was created in a laboratory, in which Applicant determined that the concept of using microwave energy in high vacuum conditions could extract essential oils from plant matter. More specifically, FIG. 1 shows an example of a system 10 in which an extraction vessel 12 (which in this example is in the form of a borosilicate glass flask) is provided within a microwave source 14 (which in this example is a common 900 watt microwave oven), and the microwave source is used to apply microwave energy to the plant matter 15 within the extraction vessel 12. The system 10 also includes a vacuum system 16 (such as a 2-stage rotary vane pump) for reducing the pressure within the extraction vessel 12. The system 10 also includes a condenser vessel 18 (which is this example is made of borosilicate glass), and a temperature control circulator 20 that is interfaced with the condenser vessel 18. The temperature control circulator 20 may comprise, for example, a laboratory scale chiller (with an ancillary heating element) which has a temperature range capability of operating between about −50° C. to about 150° C. In preferred embodiments, the chiller is operated at a very low temperature (such as approximately −40° C.) to assure that all vapors entering the condenser vessel (18) are condensed to the liquid and/or solid phase.

In experiments using the system 10 of FIG. 1, the temperature within the condenser vessel 18 was varied from −50 to +150° C. by the temperature control circulator 20, and the maximum vacuum provided by the vacuum system 16 to the extraction vessel 12 was approximately 1.0 mm Hg. In these experiments, the source plant matter 15 was a hops composition (such as that used in the beermaking process), which contained terpenoids, bitter acids and other organic compounds having boiling points ranging from 150° C. to 600° C. The objective of the investigation was to determine, with a simple apparatus, such as that of FIG. 1, utilizing an extraction vessel 12 exposed to microwave energy in combination with high vacuum, whether such a system was capable of extracting the organic compounds contained in the hops. Initial experiments yielded a 3-phase distillate containing water, terpenoids and bitter acids, thus demonstrating that the combination of microwave energy and high vacuum applied to vegetable products was able to extract a variety of organic compounds from the vegetable matter. Subsequent testing using the same system of FIG. 1 also confirmed that the combination of microwave energy and high vacuum could also be used for extracting other essential oils, such as cannabinoids, from the relevant type of plant matter.

Turning now to FIG. 2A, a schematic diagram depicting a first embodiment of the system 10 of the present invention is shown. The system 10 of FIG. 2A can be used for a method of extracting one or more essential oils from plant matter. More specifically, the system 10 of FIG. 2A can be used for a method in which microwave energy, provided by a microwave source 14, is applied to plant matter (such as hemp plant products) within the extraction vessel 12 to heat the plant matter, while that plant matter is also subjected to the application of a medium to high vacuum from a vacuum system 16, which in this embodiment consists of a first vacuum pump 16A (which may be, for example, a 2-Stage Rotary Vane Backing Pump) and a second vacuum pump 16B (which may be, for example, a Turbo Molecular Booster Pump), where such high vacuum reduces the boiling points of the components of the plant matter within the extraction vessel.

More specifically, when the plant matter comprises hemp plant products, the application of the medium to high vacuum to the hemp plant products within the extraction vessel 12 reduces the boiling points of the cannabinoids contained in hemp plant products. Since such medium to high vacuum reduces the temperature requirements to reach the boiling points of the terpenoids and the cannabinoids contained in the hemp plant products, thermal degradation or isomerization of the valuable molecules can be precluded, or at least reduced. It should be noted that the vacuum system design is intended to operate at absolute pressure levels as low as 0.001 mm Hg in a dry state, which pressure is considered "High Vacuum," however test data has indicated that even modest vacuum levels of 1-20 mm Hg (absolute pressure) are very effective in the vaporization of cannabinoids, at relatively high rates, which rates are generally proportional to the absolute pressure at which the extraction is conducted.

In the embodiment depicted in FIG. 2A, the extraction vessel 12 is preferably fabricated from a metal, such as 316 stainless steel. Such stainless steel, or other similar reflective metal, is preferred because it serves as a reflector of the microwave energy, which facilitates the dispersion of the microwave energy within the extraction vessel 12. The microwave source 14 of FIG. 2A preferably consists of a microwave emitter and a wave guide for focusing the microwave energy into the extraction vessel 12. The microwave emitter in this embodiment, as well as in the other embodiments, may be of any suitable type of microwave (such as, but not limited to, a magnetron-type of microwave, a diode-type of microwave emitter, etc.) and may emit microwave energy at a frequency between 1 GHz and 1000 GHz. As can be seen in FIG. 2A, the microwave source 14 is attached to the side of the extraction vessel 12, and is in communication with the interior of the vessel, although other configurations are also contemplated. Preferably, a rotating device 22 (shown in hidden lines) is located within the extraction vessel 12 to facilitate the even distribution of the microwave energy that is applied to plant matter. Similarly, a stirrer 24, or other mixer, is also associated with the extraction vessel 12, whereby the stirrer 24 includes a rotatable shaft with an impeller that extends into the extraction vessel 12, and interfaces with the rotating device 22, to circulate the plant matter therein.

In the FIG. 2A embodiment, the condenser vessel 18 provided consists of any known type of condenser means used for condensing vapors into liquids, and in the embodiment shown, there is also provided a collection flask 26 for collecting the resulting liquid. The temperature control circulator 20 is connected via inlet and outlet piping 28 to the condenser vessel 18, whereby the circulator 20 circulates a heat transfer fluid, such as methanol, ethanol or a specially designed low temperature heat transfer fluid (e.g., Julabo brand Thermal C5 or P60 fluids), through the vessel 18 to condense the vapor therein to a liquid in a known manner.

As can be seen in FIG. 2A, a conduit 30 connects the vacuum system 16 with the condenser vessel 18, and a pressure sensor 32 is preferably provided to monitor the pressure within the system near the condenser vessel 18. Additionally, a tube 34 is provided to connect the condenser vessel 18 with the extraction vessel 12, which allows for the free flow of vapors from the extraction vessel 12 into the condenser vessel 18, aided by the vacuum from the vacuum system 16.

A method of extracting an essential oil from plant matter, using the system of FIG. 2A, will be described next. Preferably, the first step involves drying plant matter (such as cannabis plant matter, or other plant matter from a plant within the Cannabaceae family) that includes at least one essential oil (such as a cannabinoid and/or a terpenoid) to reduce the moisture content of the plant matter. In certain embodiments, the drying step is performed until the plant matter has a moisture content of less than 1.0% by weight. Next, the plant matter which contains at least one essential oil is provided to the interior of the extraction vessel 12. The vacuum system 16, such as the first and second vacuum pumps 16A and 16B, are activated to reduce the pressure within the interior of the extraction vessel 12 with the plant matter therein. In certain embodiments, the vacuum pumps result in a medium to high vacuum environment (100 mm Hg to 0.001 mm Hg absolute pressure) within the closed system (which includes the extraction vessel 12 and the condenser vessel 18). In other embodiments, the reduced pressure can be an absolute pressure of less than 1.0 mm Hg absolute pressure.

Next, the microwave source 14 is used to apply microwave energy to the plant matter that is within the extraction vessel 12 while the interior of the extraction vessel 12 is under the reduced pressure. Directing the microwave energy into the extraction vessel 12 causes the oils, waxes and other molecules contained in the plant matter to increase in temperature. A combination of the reduced pressure and the microwave energy reduces the observed boiling point of terpenoids, cannabinoids or other high boiling point oils contained within the essential oil, and creates a vapor comprising at least a portion of the essential oil included with the plant matter within the extraction vessel 12. Preferably, the vapor comprising at least a portion of the essential oil is created without the use of any of the following solvents: butane, propane, ethanol, and supercritical CO2. However, it is also contemplated that one or more of such solvents could be utilized, if desired. It is also contemplated that if such solvents are utilized, they can be utilized in lesser amounts than used in conventional processes. In preferred embodiments, the step of using the vacuum system 16 and the step of applying microwave energy are performed after the step of drying the plant matter.

Preferably, while the plant matter is within the extraction vessel 12 with the microwave energy being applied thereto, a step of circulating the plant matter is performed to facilitate the distribution of the microwave energy being applied to the plant matter. For example, such circulating may involve stirring of the plant matter by the stirrer 24, that is associated with the extraction vessel 12, which operates the rotating device 22 within the extraction vessel 12, that in combination are used to rotate the plant matter.

The process continues by directing the vapor that comprises at least a portion of the essential oil from the extraction vessel 12 to the condenser vessel 18, aided, at least in part, by the vacuum force created by the vacuum system 16 that passes into the system via the conduit 30. The condenser vessel 18 is used to condense the vapor that comprises at least a portion of the essential oil (such as a cannabinoid or a terpenoid), to a liquid including the essential oil, where, in this embodiment, the liquid is collected in the collection flask 26. The temperature control circulator 20 controls the temperature in the condensing vessel 18 by circulating a heat transfer media, and is set at a temperature setting appropriate for condensing the desired extracted oils, waxes and other organic compounds.

In this embodiment, as well as in the other embodiments, the application of microwave energy under the high vacuum conditions results in the boiling point of organic oils, waxes and other molecules being significantly reduced. This combination of high vacuum and elevated temperature causes organic oils, waxes and other molecules to vaporize. As the organic vapors travel in the direction of high vacuum, they must pass through the condenser vessel 18, where the internal operating temperature is controlled such that organic vapors are condensed into a liquid which is collected in the collection flask 26, or other collection means.

In the case of essential oils such as cannabinoids, the boiling point of the compounds ranges from approximately 400° C. to approximately 500° C. However, the application of vacuum conditions, which may result in a system absolute pressure between 200 to 0.001 mm Hg, results in a reduction of the boiling point range to a range between approximately 340° C. to approximately 90° C., respectively. The vaporization of essential oils at relatively low temperatures precludes (or at least minimizes) thermal decomposition or derivatization of valuable molecules such as cannabinoids. The likelihood of oxidation is also reduced as a result of the high vacuum conditions. However, in the case cannabinoid extractions the intensity of the microwave energy combined with the application of vacuum causes the acid form of the cannabinoids (e.g., CBDA-cannabidiolic acid, and THCA-tetrahydrocannabinolic acid) to be converted to the non-acid form (CBD—cannabidiol, and THC—tetrahydrocannabinol) which molecules are more desirable than the precursor acid form. Since this conversion, referred to as decarboxylation, is normally accomplished as a separate processing step required when using other extraction methods, the microwave extraction method described herein likely has processing cost advantages when compared to other extraction methods. In addition to the benefits obtained with insitu decarboxylation microwave extraction, tests suggest microwave extraction has the potential for a more molecule selective extraction than other extraction methods. Through selective control of microwave energy emitted into the extraction vessel, a richer cannabinoid distillate is obtained when compared to alternative extraction methods. For example, CBD distillates obtained from the microwave extractor typically contained CBD concentrations of 50% to 60%+ in the extracted oil. In the case of CBD microwave extraction cited above, it is likely that higher boiling point molecules, such as triglycerides and waxes, remained with the biomass because insufficient microwave energy levels were applied to cause vaporization of these molecules.

Figure 2B:
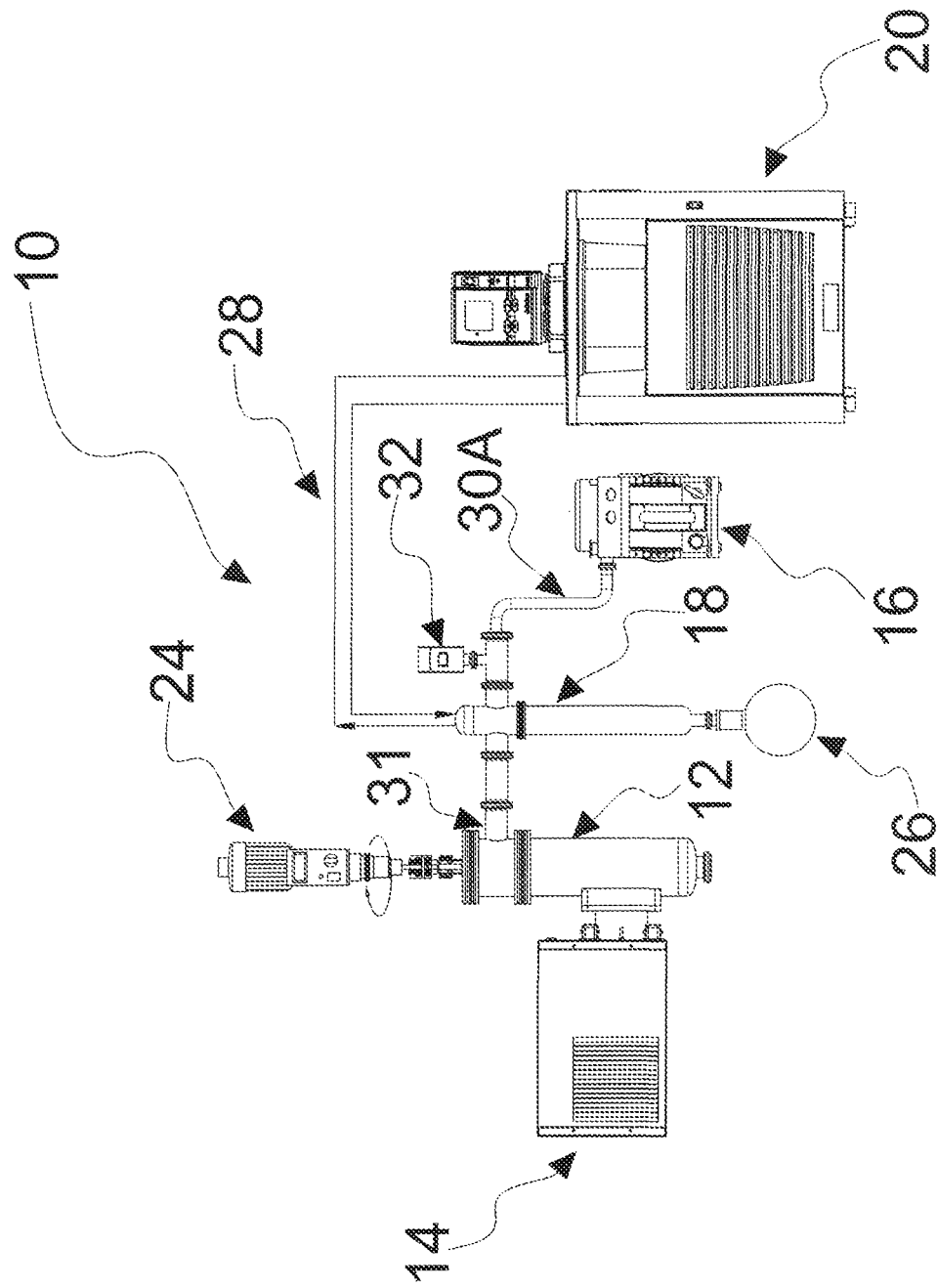
FIG. 2B is a schematic diagram depicting a modification of the embodiment of FIG. 2A.

Turning now to FIG. 2B, a modification of the system 10 of FIG. 2A is shown and will be described. Unless otherwise noted, features of the system 10 of FIG. 2B are the same as those of FIG. 2A, and the same reference numbers are used for both figures.

The main way that the FIG. 2B embodiment differs from the FIG. 2A embodiment concerns that manner in which the conduit 30A passes the vacuum force created by the vacuum source 16 into the system. In particular, in the FIG. 2B embodiment, vacuum port 31 is at or near the top of the extractor vessel 12, such that the vacuum port 31 is located well above the charge of the plant matter within the vessel 12, which allows for the oil depleted plant matter to be easily discharged out of the bottom of the vessel 12. FIG. 2B also differs from FIG. 2A in that it only includes a single vacuum source 16, while FIG. 2A includes a first vacuum pump 16A and a second vacuum pump 16B. However, it is contemplated that first and second vacuum pumps could be incorporated into the FIG. 2B embodiment.

Figure 3A:
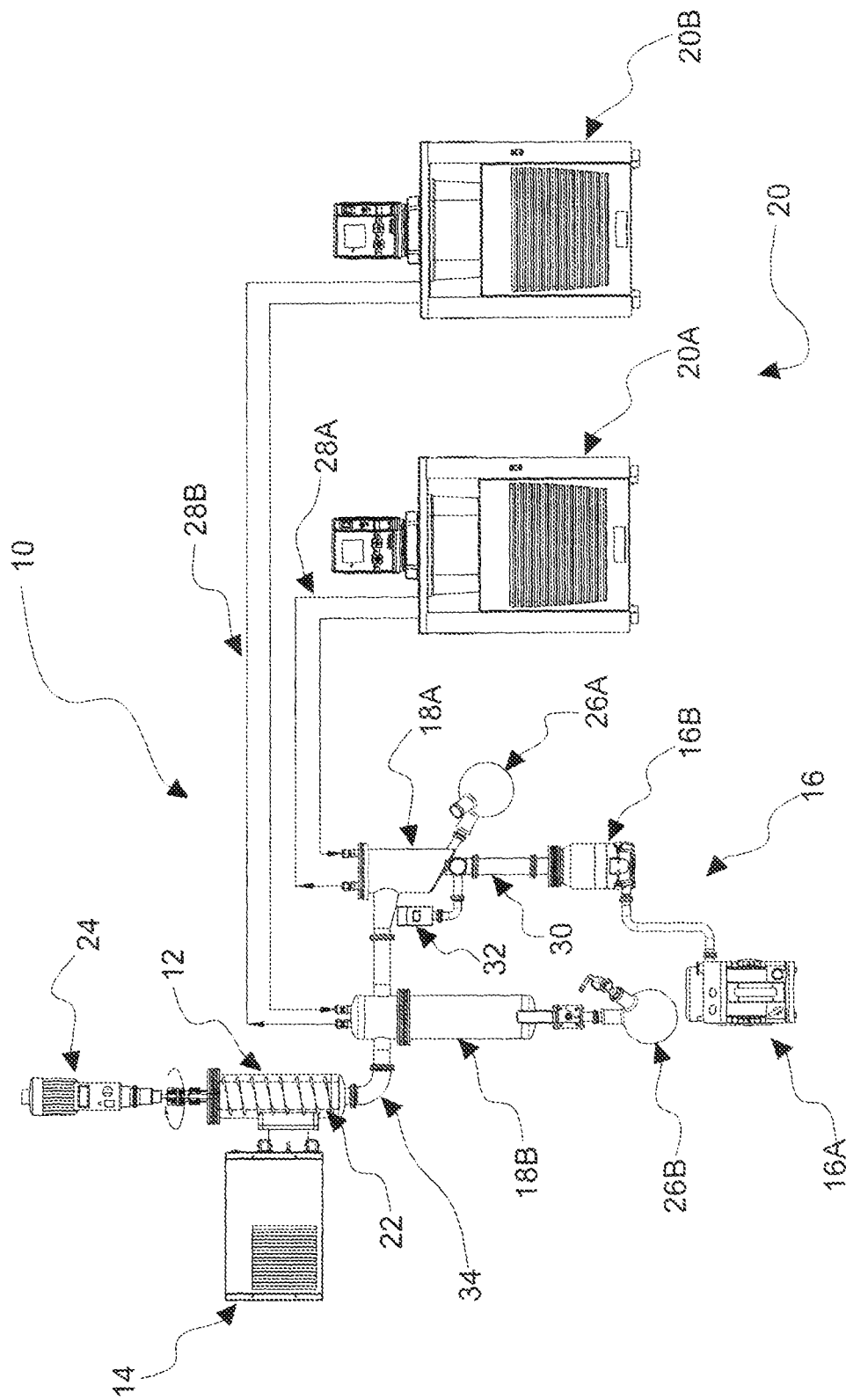
FIG. 3A is a schematic diagram depicting a modification of the first embodiment of FIG. 2A.

Turning now to FIG. 3A, a modification of the system 10 of FIG. 2A is shown and will be described. Unless otherwise noted, features of the system 10 of FIG. 3A are the same as those of FIG. 2A, and the same reference numbers are used for both figures.

One of the ways that the system of FIG. 3A differs from that of FIG. 2A is that there are two condenser vessels, numbered as 18A and 18B, as well as two associated collection flasks (26A and 26B), included in the system of FIG. 3. The use of two condenser vessels 18A/18B facilitates the separation of lower boiling point molecules from higher boiling point molecules, and also protects the vacuum system 16. For example, it is contemplated that the condenser 18B, which is downstream of the extraction vessel 12, would operate at, for example 80° C., in order to capture the cannabinoid vapors (e.g., vapor to liquid transition), while the condenser 18A would operate at, for example –50° C. (or lower), to capture the terpenoids. The lower the temperature of condenser 18A, the better for condensing low BP terpenoids. Since each of the condenser vessels 18A and 18B are intended to operate at a different temperature range, one temperature control circulator is associated with each condenser vessel (i.e., temperature control circulator 20A is associated with condenser vessel 18A, and temperature control circulator 20B is associated with condenser vessel 18B). Of course, it is also contemplated that more than two condenser vessels could be used, and thus more than two temperature control circulators would also be needed, with one controller associated with each vessel. When more than two condensers are used for the separation of different essential oil fractions, each additional condenser would operate at a temperature different from the first or second condensers in order to separate additional molecular fractions of an essential oil.

In the case of essential oil plants including cannabis (as well as or other plants within the Cannabaceae family), in addition to the heavier molecular fractions such as cannabinoids, lighter molecular fractions are also present in the plant matter. Specifically, such lighter molecular fractions include terpenoids, which have boiling points in the range of 150° C. to 400° C., and under high vacuum conditions will require extremely low temperatures to condense their vapors into a liquid phase. For example, limonene is a common low boiling point terpenoid, and limonene has an atmospheric boiling point of 176° C. However, at high vacuum conditions of 0.001 mm Hg absolute pressure, the boiling point of limonene falls to –50° C. FIG. 3A illustrates an example of a modified extraction system utilizing two condensers (18A and 18B), where the condenser 18B is used to condense cannabinoids and operates at approximately 80° C., while the condenser 18A constitutes a cold trap operating at –50° C., for the purpose of condensing terpenoids, such as limonene. In preferred embodiments, it is contemplated that condenser 18B operates within the range of 70° C. to 100° C., while the condenser 18A operates at –40° C. to –90° C. Alternatively, the microwave extraction vessel can be operated at a higher absolute pressure level of say 10 mm Hg, where condenser 18B would continue to operate within the range of 70° C. to 100° C., while the condenser 18A could operate at –20° C. to –50° C., since the boiling point of limonene at 10 mm Hg is approximately 58° C.

Turning now to FIG. 3B, a modification of the system 10 of FIG. 3A is shown and will be described. Unless otherwise noted, features of the system 10 of FIG. 3B are the same as those of FIG. 3A, and the same reference numbers are used for both figures.

The main way that the FIG. 3B embodiment differs from the FIG. 3A embodiment concerns that manner in which the conduit 30A passes the vacuum force created by the vacuum source 16 into the system. In particular, in the FIG. 3B embodiment, vacuum port 31 is at or near the top of the extractor vessel 12, such that the vacuum port 31 is located well above the charge of the plant matter within the vessel 12, which allows for the oil depleted plant matter to be easily discharged out of the bottom of the vessel 12. FIG. 3B also differs from FIG. 3A in that it only includes a single vacuum source 16, while FIG. 3A includes a first vacuum pump 16A and a second vacuum pump 16B. However, it is contemplated that first and second vacuum pumps could be incorporated into the FIG. 3B embodiment.

The inclusion of more than one condenser, in comparing FIGS. 2A and 3A (or 2B and 3B) does not affect the benefits derived from microwave extraction related to decarboxylation or separation selectivity, and such benefits would be expected regardless of the number of condensers included in the microwave extraction system.

Figure 4:
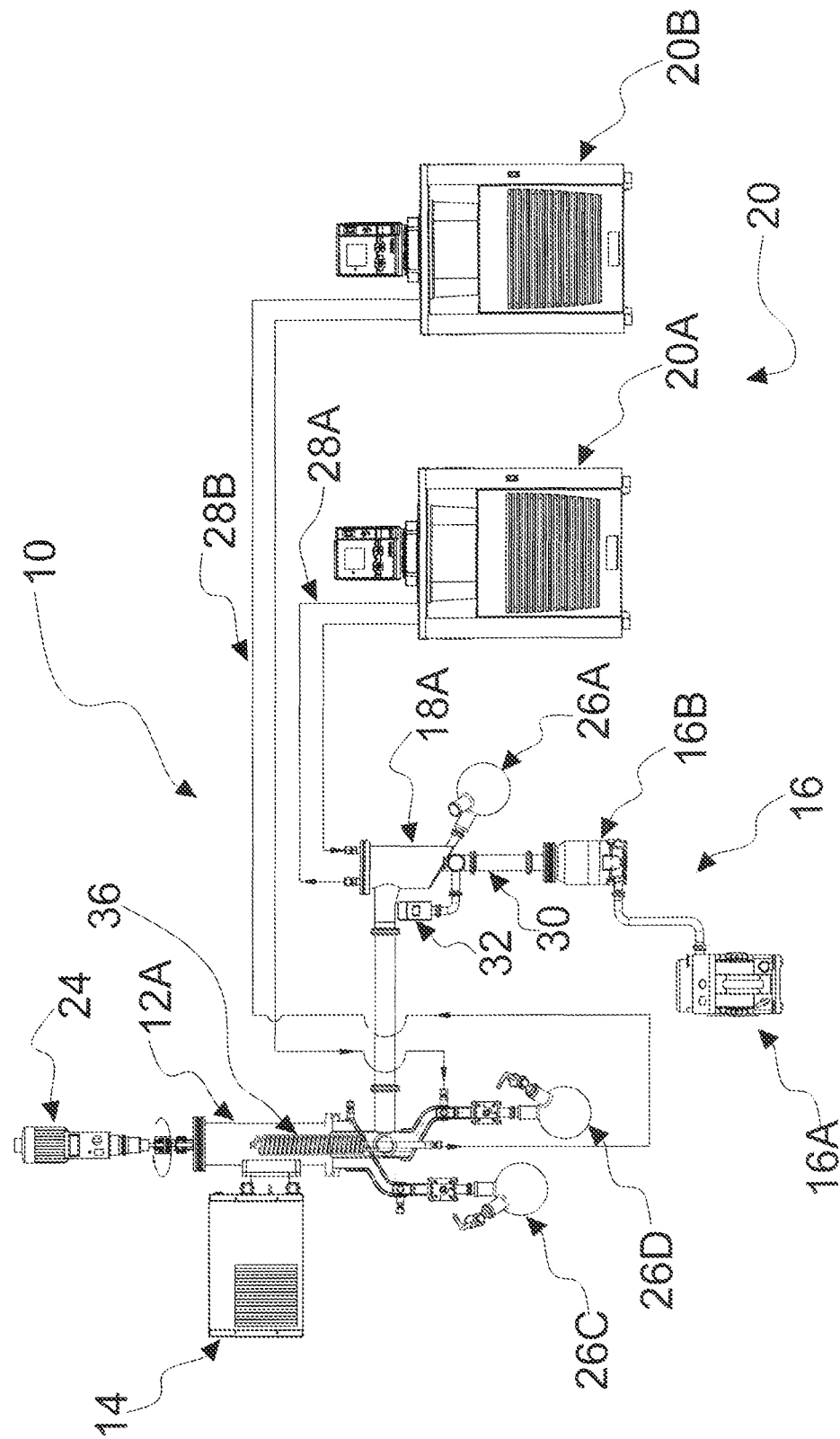
FIG. 4 is a schematic diagram depicting a second modification of the first present invention.

Turning now to FIG. 4, another modification of the system 10 of FIG. 2A is shown and will be described. Unless otherwise noted, features of the system 10 of FIG. 4 are the same as those of FIG. 2A, and the same reference numbers are used for both figures. In the system depicted in FIG. 4, the extraction vessel 12 of FIG. 2A has been replaced with a different type of extraction vessel. Namely, in FIG. 4, the extraction vessel includes an internal condenser 36 on the inside thereof. This internal condenser 36 serves as an alternative to the condenser 18B of FIG. 3, and generally serves the same purpose as condenser 18B. The use of the internal condenser 36 inside of the extraction vessel 12A facilitates the attainment of "Higher Vacuum Conditions" which may be helpful in the extraction of essential oils components, such as cannabinoids, from plant material at a low operating temperature. Improvements in vacuum levels are obtained because the internal condenser 36, which is located in direct proximity to the plant matter, transitions vapors into the liquid phase almost immediately after generation, thereby removing molecular impedance to attaining high vacuum.

Figure 5:
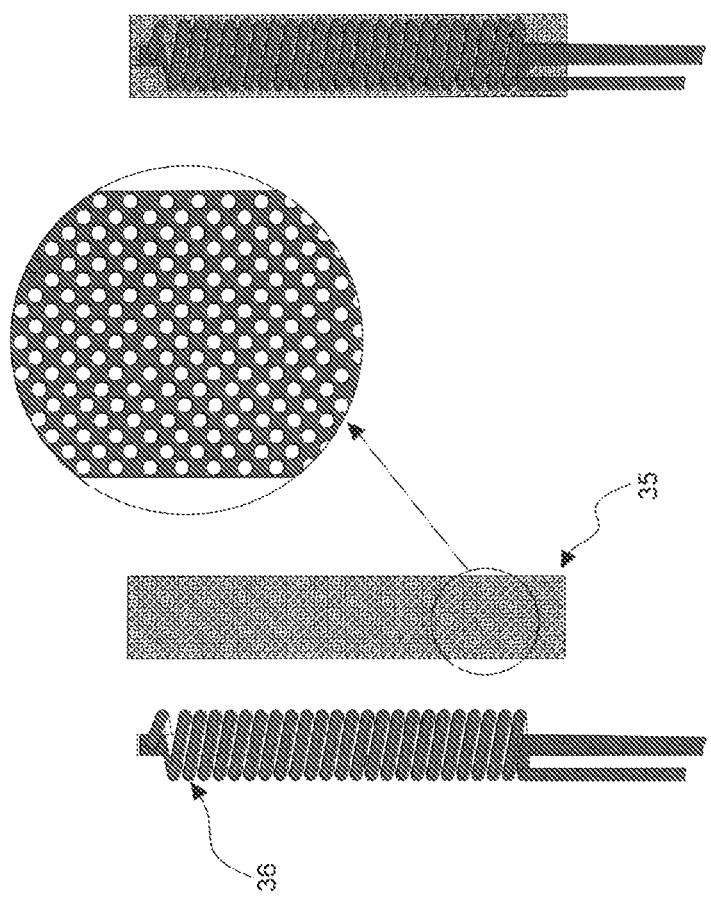
FIG. 5 is a schematic diagram depicting a modification of the embodiment of FIG. 4.

In FIG. 4, the internal condenser 36 is depicted as a stainless-steel coil, and such a configuration is known to those of ordinary skill in the art, but single tube condensers may also be employed. Additionally, other alternative known configurations, such as stainless-steel tube bundle style condensers, can also be used, and are preferred in larger scale devices. Preferably, the internal condenser 36 is protected with a cover in the form of a perforated sheet, which serves to segregate the plant matter from the condenser, and which also serves to reflect the microwave energy back into the plant matter. Such a cover may be formed of any desired material, such as metal, and more preferably, the cover is made of stainless steel. FIG. 5 shows one example of such a cover 35, and the right-hand side of the figure shows the combination of the cover 35 when installed over the condensing element 36. The perforations in the condenser cover 35 allow for the passage of vapors to the condenser to accomplish the vapor to liquid phase transition. The use of an internal condenser inside of a vessel is commonly used in short-path distillation equipment, which is well known for the ability to attain vacuum levels as low as 1×10-3 mm Hg.

Turning back to FIG. 4, this figure shows an embodiment in which collection flask 26C is attached to a "Residue" discharge nozzle of the extraction vessel 12A, and flask 26C collects those molecules of the extracted liquid which did not boil (or vaporize) in the extraction vessel 12A, where such molecules are expected to be triglycerides or waxes from the vegetable matter. Collection flask 26D collects lighter molecules which vaporized in the extraction vessel 12A and are subsequently condensed on the condensing element 36, and then flow by gravity to the "Distillate"

nozzle of the extraction vessel 12A. Lighter, non-condensed, molecules will continue to travel to the secondary condenser vessel, 18A, and will subsequently be collected in flask 26A.

Figure 6:
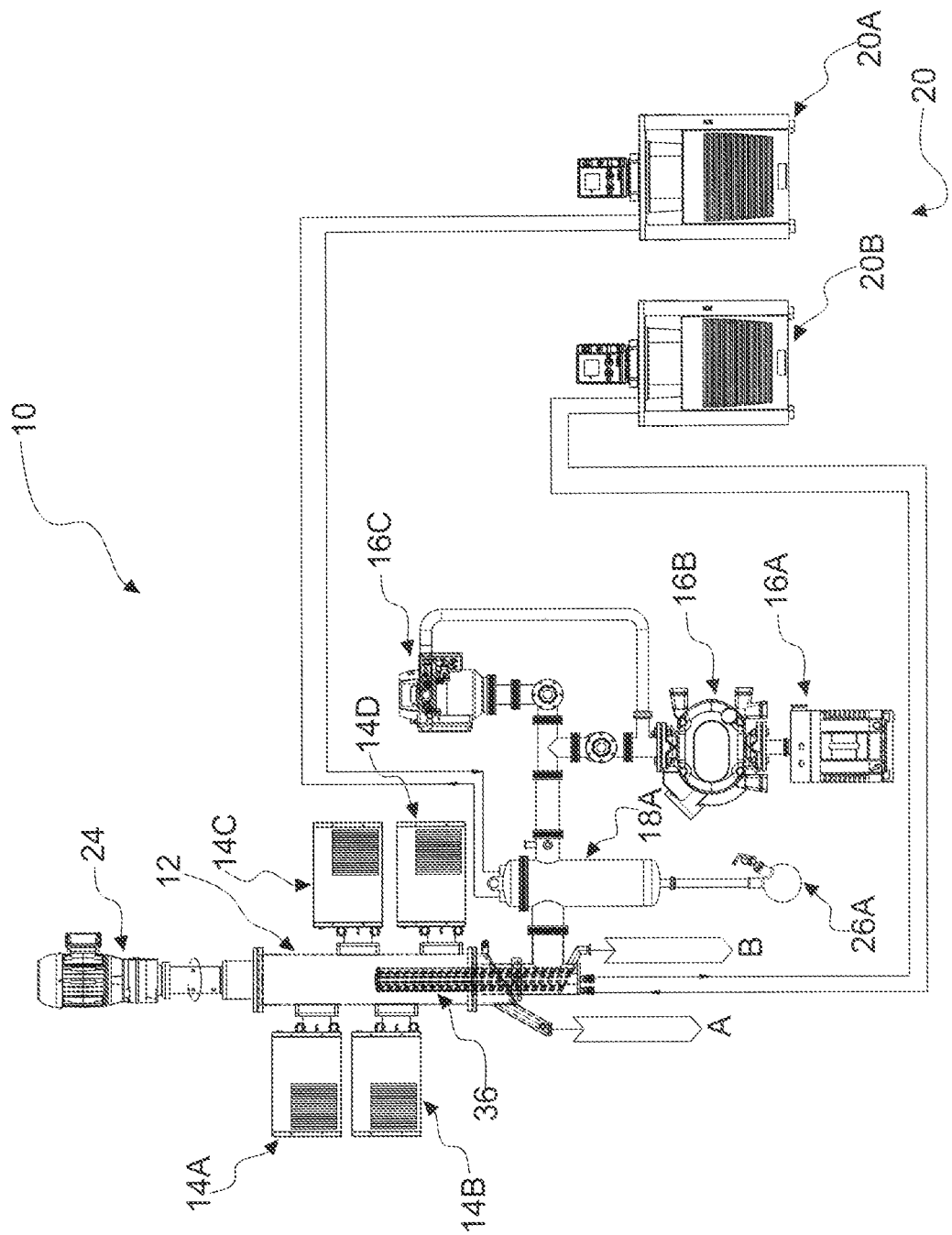
FIG. 6 is a perspective view of an extraction vessel that includes a port through which the microwave energy can be introduced into the vessel.

Finally, turning to FIG. 6, another modification of the systems 10 of FIGS. 2-4 is shown and will be described. Unless otherwise noted, features of the system 10 of FIG. 6 are the same as those of FIGS. 2-4, and the same reference numbers are used. In the system depicted in FIG. 6, multiple microwave sources 14A, 14B, 14C and 14D are employed around the outer perimeter of the extraction vessel 12. The use of such a plurality of microwave sources is especially beneficial when the extraction vessel 12 is of a large scale. Preferably, the microwave sources 14A-14D are strategically placed around the extraction vessel in a manner intended to obtain a uniform energy field, which will result in higher extraction yields. In FIG. 6, four microware sources (14A-14D) are shown, but the number of microwave sources may also be greater than four, or less than four, as desired. Further, as mentioned earlier, such microwave sources may be of any desired type, such as magnetron-type, diode-type, etc.

FIG. 6 also includes two callouts (A and B) showing material flows within the system. In particular, Callout A represents the discharge of residue oils from the extraction vessel 12 and Callout B represents the discharge of oils which were condensed by the internal condensing element inside of the extractor. It should be noted that in the embodiment of FIG. 5, the vacuum system 16 consists of three pumps: pump 16C, a TurboMolecular Booster Pump; pump 16B, a Roots Booster Pump; and pump 16A, a 2-stage rotary vane backing vacuum pump, although other vacuum system configurations are also contemplated.

Figure 7:
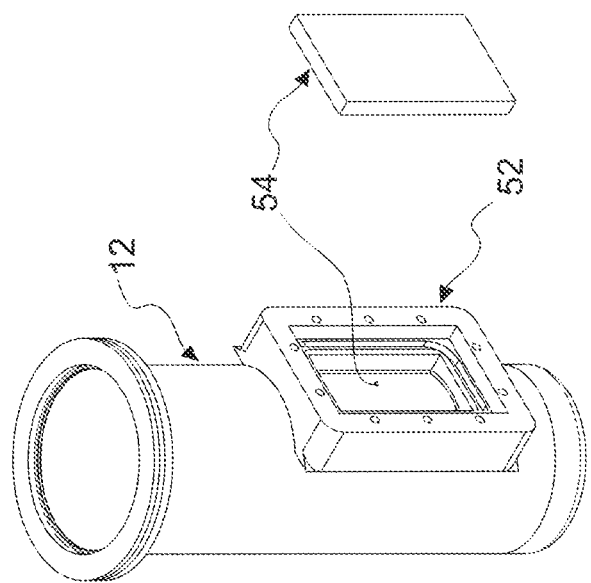
FIG. 7 depicts a reflector plate that is configured to be inserted between the microwave wave guide and the window to partially reflect and disperse the microwave energy more effectively within the extraction chamber.
Figure 8:
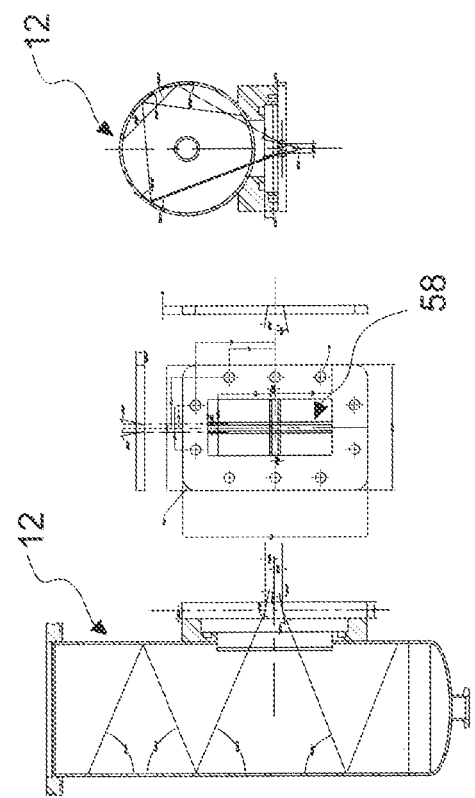
FIG. 8 illustrates vertical and horizontal reflector plates seated within an extractor vessel.

The present inventor has also evaluated/contemplated the effects of various different ancillary design features that can influence the vaporization and separation characteristics of a microwave extraction system. Such ancillary design considerations include:

a) Microwave Emitter Port Design: Conventional Microwave Emitters utilize a "wave guide" to develop a uniform wave front as the energy exits the emitter. FIG. 7 shows one example of an extraction vessel 12 of the present invention that includes a port 52 (i.e., where the microwave energy is introduced from the microwave emitter 14 (shown in any of FIGS. 1-4 and 6) to the extraction vessel 12, where such a port 52 is designed to facilitate securing the wave guide of the microwave emitter 14 to the vessel 12 and preferably incorporates a "window" 54 to isolate the microwave emitter 14 from the high vacuum vessel 12. The material of construction (MOC) for the window 54 is ideally totally transparent to microwave energy to allow complete passage of the energy into the vessel. Further, the MOC of such a window 54 must have sufficient strength, thermal resistance, and expansion properties to maintain use under heated, high vacuum conditions. The present inventor evaluated materials such as the following: (i) borosilicate glass; (ii) PTFE; and (iii) quartz. These materials were regarded as the most cost effective, readily available products which could accommodate the required working pressures and temperatures, and which also exhibited desirable transparency properties for microwave transmission. Of these materials, quartz was shown to be a reliable MOC for the window 54 in relation to transparency and thermal stability properties. However, other materials are also contemplated as having the desirable combination of properties, such as germanium-based glass and zirconium-based glass.

b) Dispersion of microwave energy: The waveguide associated with most conventional microwave emitters often results in the focusing of the energy in the center of the waveguide's exit port. So, instead of a relatively flat plane profile of exiting energy, the wavefront tended to assume the profile of a 3D parabolic front. The present inventor has developed a series of reflector plates, such as reflector plate 58 of FIG. 8, configured to be inserted between the microwave wave guide and the window to partially reflect and disperse the microwave energy more effectively within the extraction chamber. FIG. 8 also illustrates the positioning of reflector plates within a supporting window. The reflector plates are installed in both horizontal and vertical planes and positioned at an angle which will reflect the waves emitted from the microwave device to achieve improved dispersion of the microwave energy. FIG. 8 further illustrates the partial reflection pattern of the vertical and horizontal plates within the extractor vessel 12, in vertical and horizontal cross-sectional views.

c) Circulation of Plant Matter: Dispersion of the microwave energy may have limitations based upon the microwave guide and/or a downstream reflector plate described above. Local heating zones inside of the extraction vessel can be minimizes by using a circulating device which encourages the internal flow of plant matter throughout the vessel. Such a device is represented by stirrer 24 and rotating device 22 of FIGS. 2-4 and 6.

d) Use of Absorbents: Early testing utilized exclusively hemp flour in the extraction vessel based upon the premise that the plant fiber would be transparent to microwave energy, while the slightly polar cannabinoids would absorb energy. This principle proved to be accurate, however it was deemed sound practice to determine if the addition of microwave absorbing materials might enhance the energy efficiency by reducing back-reflection into the emitter and also enhance the yield efficiency associated with cannabinoid extraction. Absorbing materials, such as carbon and pure graphite, added to the plant matter 15 did improve energy absorption as measured by temperature profiles. Further, small liquid additions of polar solvents, including alcohols, to the plant matter 15 also improved absorption efficiency.

While various embodiments of the present invention have been shown and described, it should be understood that other modifications, substitutions and alternatives may be apparent to one of ordinary skill in the art. For example, components from the different embodiments can be substituted for similar components in other embodiments, thereby creating new embodiments. Such modifications, substitutions and alternatives can be made without departing from the spirit and scope of the invention, which should be determined from the appended claims.

Various features of the invention are set forth in the appended claims.

What is claimed is:

1. A method of extracting an essential oil from plant matter, the method comprising:
providing plant matter to an interior of an extraction vessel, wherein composition of the plant matter includes at least one essential oil;

using at least one vacuum pump to reduce the pressure within the interior of the extraction vessel with the plant matter therein to an absolute pressure of less than 400 mm Hg absolute pressure;

applying microwave energy to the plant matter that is within the extraction vessel while the interior of the extraction vessel is under the reduced pressure, wherein a combination of the reduced pressure and the microwave energy creates a vapor comprising at least a portion of the essential oil contained within the plant matter provided inside of the extraction vessel;

directing the vapor that comprises at least a portion of the essential oil from the extraction vessel to at least one condenser means; and condensing the vapor to a liquid state such that the vapor comprises at least a portion of the essential oil, by utilizing the at least one condenser means, to at least one liquid including the essential oil, and wherein the method further comprises a step of drying the plant matter including the at least one essential oil prior to the step of using the at least one vacuum pump and the step of applying the microwave energy.

2. The method according to claim 1, wherein:
the at least one condenser means comprises at least one condenser vessel; and
the extraction vessel, the at least one condenser vessel and the at least one vacuum pump are configured and arranged to create a flow path of the vapor from the extraction vessel towards the at least one vacuum pump after passing through the at least one condenser vessel.

3. The method according to claim 1, wherein:
the at least one condenser means comprises at least one condenser vessel; and
the step of condensing the vapor to a liquid includes collecting the liquid in a collection vessel that is in fluid communication with the at least one condenser vessel.

4. The method according to claim 1, further comprising a step of circulating the plant matter including the at least one essential oil while the plant matter is within the extraction vessel, whereby said circulating facilitates distribution of said microwave energy applied during the step of applying microwave energy.

5. The method according to claim 4, wherein the step of circulating the plant matter within the extraction vessel comprises rotating and/or mixing the plant matter within the extraction vessel to facilitate a homogeneous distribution of the plant matter temperature within the extractor vessel and a uniform exposure to the microwave energy.

6. The method according to claim 1, wherein the step of applying microwave energy includes providing a window for separating a microwave source from the extraction vessel to achieve vacuum requirements, and having a material of construction of the window consisting of a mineral or plastic with properties including low microwave absorptivity and that is dimensionally stable at high temperatures.

7. The method according to claim 1, wherein the step of applying microwave energy includes providing a reflection plate between a microwave source and the extraction vessel to facilitate dispersion of the microwave energy throughout the interior of the extraction vessel, and where the material of construction of the reflection plate is a material having low absorptivity and high reflectivity of microwave energy.

8. The method according to claim 1, wherein as a result of the drying step, the plant matter has a moisture content of less than 5.0% by weight.

9. The method according to claim 1, wherein the step of using the at least one vacuum pump reduces the absolute pressure within the interior of the extraction vessel to between about 400 mm Hg absolute pressure and 0.0001 mm Hg absolute pressure.

10. The method according to claim 1, wherein the vapor comprising at least a portion of the essential oil is created by the combination of the reduced pressure and the microwave energy, thereby reducing the observed boiling point.

11. The method according to claim 1, wherein the vapor comprising at least a portion of the essential oil is created without the use of any of the following solvents: butane, propane, ethanol, and supercritical $CO_2$.

12. The method according to claim 1, wherein:
the at least one condenser means comprises a first condenser vessel and a second condenser vessel; and
the step of condensing the vapor comprises passing the vapor through the first condenser that is operated within a first temperature range to create a first liquid that includes a first condensate and then passing the vapor through the second condenser that is operated within a second temperature range to create a second liquid that includes a second condensate, where the second temperature range is lower than the first temperature range.

13. The method according to claim 12, wherein:
the first condensate comprises a first essential oil; and
the second condensate comprises a second essential oil.

14. The method according to claim 1, wherein the plant matter comprises plant matter from a plant within the Cannabaceae family, and the at least one essential oil comprises at least one cannabinoid or terpenoid.

15. The method according to claim 1, wherein the plant matter comprises hemp and the at least one essential oil comprises at least one cannabinoid or terpenoid.

16. The method according to claim 1, wherein the at least one condenser means comprises an internal condenser that is located within the extraction vessel.

17. The method according to claim 16, wherein the internal condenser comprises a coil that is configured and arranged as a heat exchanger.

18. The method according to claim 16, wherein the internal condenser comprises a tube bundle that is configured and arranged as a heat exchanger.

19. The method according to claim 16, wherein the internal condenser comprises a single tube that is configured and arranged as a heat exchanger.

20. A method of extracting an essential oil from plant matter, the method comprising:
drying plant matter that includes at least one essential oil until the plant matter has a moisture content of less than 5.0% by weight;
providing the plant matter to an interior of an extraction vessel, wherein the plant matter includes at least one essential oil;
using at least one vacuum pump to reduce the pressure within the interior of the extraction vessel with the plant matter;
applying microwave energy to the plant matter that is within the extraction vessel while the interior of the extraction vessel is under the reduced pressure, wherein a combination of the reduced pressure and the microwave energy reduces the observed boiling point and creates a vapor comprising at least a portion of the essential oil included with the plant matter within the extraction vessel, wherein the step of using the at least one vacuum pump and the step of applying microwave energy are performed after the step of drying the plant matter;

directing the vapor that comprises at least a portion of the essential oil from the extraction vessel to at least one condenser means; and condensing the vapor that comprises at least a portion of the essential oil, by utilizing the at least one condenser means, to at least one liquid including the essential oil.

21. The method according to claim 20, wherein:

the at least one condenser means comprises at least one condenser vessel; and the extraction vessel, the at least one condenser vessel and the at least one vacuum pump are configured and arranged to create a flow path of the vapor from the extraction vessel towards the at least one vacuum pump after passing through the at least one condenser vessel.

22. The method according to claim 1, further comprising a step of providing a microwave energy absorbing material to the extraction vessel prior to the step of applying microwave energy.

23. The method according to claim 20, further comprising a step of providing a microwave energy absorbing material to the extraction vessel prior to the step of applying microwave energy.

24. The method according to claim 23, wherein the microwave energy absorbing material is selected from the group consisting of graphite, a carbon compound and an alcohol.

25. The method according to claim 22, wherein the microwave energy absorbing material is selected from the group consisting of graphite, a carbon compound and an alcohol.

26. A method of extracting an essential oil from plant matter, the method comprising:

providing plant matter to an interior of an extraction vessel, wherein composition of the plant matter includes at least one essential oil;

using at least one vacuum pump to reduce the pressure within the interior of the extraction vessel with the plant matter therein, wherein the step of using the at least one vacuum pump comprises reducing the pressure within the interior of the extraction vessel with the plant matter therein to an absolute pressure of between 5 and 300 mm Hg absolute pressure;

applying microwave energy at a frequency between 1 GHz and 1000 GHz to the plant matter that is within the extraction vessel while the interior of the extraction vessel is under the reduced pressure, wherein a combination of the reduced pressure and the microwave energy creates a vapor comprising at least a portion of the essential oil contained within the plant matter provided inside of the extraction vessel;

directing the vapor that comprises at least a portion of the essential oil from the extraction vessel to at least one condenser means; and condensing the vapor to a liquid state such that the vapor comprises at least a portion of the essential oil, by utilizing the at least one condenser means, to at least one liquid including the essential oil.

27. The method according to claim 26, wherein the at least one condenser means comprises an internal condenser that is located within the extraction vessel.

28. The method according to claim 26, wherein the step of applying microwave energy includes providing a window for separating a microwave source from the extraction vessel to achieve vacuum requirements, and having a material of construction of the window consisting of a mineral or plastic with properties including low microwave absorptivity and that is dimensionally stable at high temperatures.

29. The method according to claim 26, wherein the step of applying microwave energy includes providing a reflection plate to facilitate dispersion of the microwave energy throughout the interior of the extraction vessel, and where the material of construction of the reflection plate is a material having low absorptivity and high reflectivity of microwave energy.

\* \* \* \* \*